L. W. HASSELMAN.
GRAIN-SEPARATOR.
No. 171,222. Patented Dec. 21, 1875.
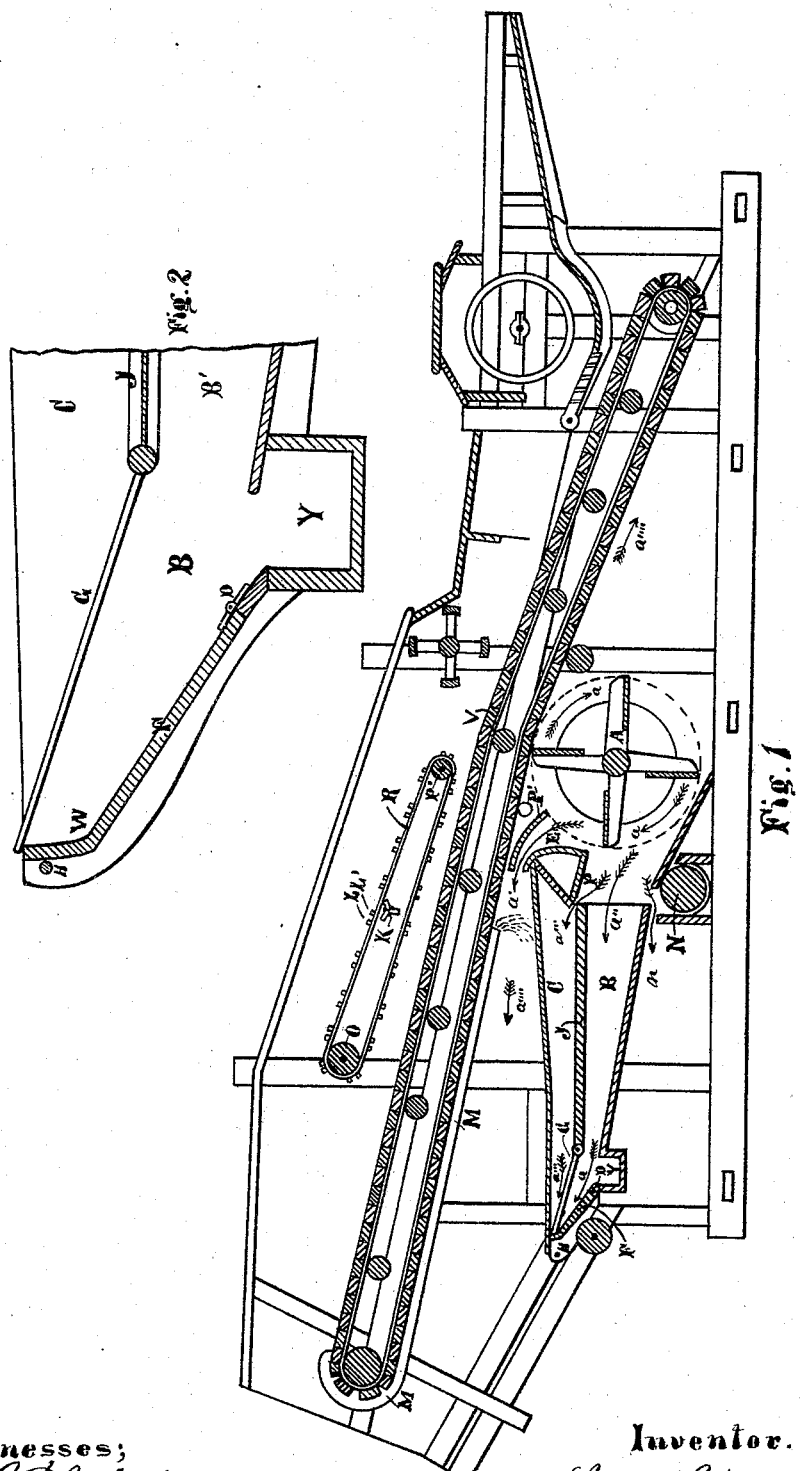

UNITED STATES PATENT OFFICE.

LEWIS W. HASSELMAN, OF INDIANAPOLIS, INDIANA.

IMPROVEMENT IN GRAIN-SEPARATORS.

Specification forming part of Letters Patent No. 171,222, dated December 21, 1875; application filed March 22, 1875.

*To all whom it may concern:*

Be it known that I, LEWIS W. HASSELMAN, of Indianapolis, county of Marion, State of Indiana, have invented an Improvement in Grain-Separators, of which the following is a specification:

My invention consists in the construction and arrangement of deflectors in connection with the fan and inclined floor under the canvas cell-carrier, in such a manner as to divide the current of air into an under and over blast, the over current of air being divided into two currents, the lower one passing directly along the upper side of the riddle, and the upper current striking the grain and foreign matter as it leaves the inclined floor, and blows out most of the chaff and foreign matter before the grain drops onto the riddle, the lower current acting on the grain and foreign matter as it drops onto the riddle, and as the grain passes through the riddle onto the bottom of the shoe the under current of air also helps to clean the grain. At the rear of the shoe, and extending beyond the grain-trough, I have arranged an adjustable floor, that can be held to any angle by a binding-rod. This adjustable floor is arranged with an inward-bent portion at the upper part, arranged so as to catch all of the grain that should be blown over the trough, and return it, the small particles of foreign matter being carried through the fingers or bars that cover the adjustable floor. The floor is made adjustable to suit the different degrees of force of the currents of air—as, for instance, if the blast is strong, then the floor should be elevated. This prevents the grain from being blown over the inwardly-bent part, and returns it to the trough, while the foreign matter is blown through the fingers or bars. If the blast is weak, then the floor should be lowered for the same purpose.

Figure 1 represents a sectional view of a grain-separator embodying my improvement. Fig. 2 is an enlarged section of the extended part of the shoe, showing more fully the arrangement of the adjustable floor.

A represents the fan, which is revolved in the direction of the arrow $a$; or, in other words, it has an under-blast motion, and the current of air is forced under the riddle J, as represented by the arrow $a''$. At the end of the riddle J, near the fan A, is a divider, P. This divider divides the under current of air, and allows part of it to pass between the divider P and top of the riddle J, while the balance of the under blast passes under the riddle J, and part under the shoe B, near the conveyer N. At the same time, what air passes by the edge of the divider P is carried up the spout E under the deflector P', in the direction of the arrow $a'$ above the riddle J. Here it comes in contact with the grain and foreign matter that leaves the inclined floor M, and before the grain can fall onto the riddle J the current of air blows out most of the chaff and foreign matter in the direction of the arrow $a''''$, and also distributes the grain over the riddle J, where it again comes in contact with the current of air $a'''$, that passes under the divider P and over the riddle J. As the grain and foreign matter passes through the riddle the under current of air $a''$ again cleans it, the foreign matter being blown up the bottom of the shoe B over the trough Y, and along the adjustable floor F, and out through the finger-bars G. The grain is prevented from being blown out by the inwardly-bent portion $w$ of the floor F, and rolls back into the trough, or along the bottom of the shoe into the conveyer N. Here, again, the current of air $n$ blows out more of the foreign matter, and the grain is conveyed to the elevator almost perfectly clean.

I do not broadly claim the floor at the rear of the shoe, as it is old; neither do I broadly claim the under and over blast current of air.

What I claim as new, and wish to secure by Letters Patent, is—

1. The combination of the hinged adjustable floor-board F, having the inwardly-bent upper edge or angle board W, adjustable fingers G, and adjustable tension-rod H, constructed and operated substantially as set forth.

2. The deflector P', in combination with the divider P, arranged and operating in connection with a fan, to separate and guide the currents of air, so as to bring it in contact with the grain and riddles, substantially as and for the purpose hereinbefore set forth.

In testimony whereof I have signed my name to this specification in the presence of two subscribing witnesses.

LEWIS W. HASSELMAN.

Witnesses:
S. C. FRINK,
JOHN W. COON.